(12) United States Patent
Nofzinger et al.

(10) Patent No.: US 7,357,749 B2
(45) Date of Patent: Apr. 15, 2008

(54) LIMITED SLIP DIFFERENTIAL AND ENGAGEMENT SENSING MECHANISM THEREFOR

(75) Inventors: Scott L. Nofzinger, Petersburg, MI (US); Gregory L. Heatwole, Ft. Wayne, IN (US)

(73) Assignee: Eaton Corporation, Cleveland, OH (US)

( * ) Notice: Subject to any disclaimer, the term of this patent is extended or adjusted under 35 U.S.C. 154(b) by 243 days.

(21) Appl. No.: 11/304,334

(22) Filed: Dec. 15, 2005

(65) Prior Publication Data

US 2007/0142157 A1 Jun. 21, 2007

(51) Int. Cl.
*F16H 48/06* (2006.01)
(52) U.S. Cl. ...................................... 475/231; 475/157
(58) Field of Classification Search ................ 475/230, 475/231, 234, 235, 237, 238, 239, 240, 241, 475/249, 150, 154, 157
See application file for complete search history.

(56) References Cited

U.S. PATENT DOCUMENTS

| | | | |
|---|---|---|---|
| RE28,004 E | 5/1974 | Ottemann | |
| 5,019,021 A | 5/1991 | Janson | |
| 6,551,209 B2 | 4/2003 | Cheadle et al. | |
| 6,857,982 B2* | 2/2005 | Tomari et al. | 475/231 |
| 6,966,863 B2* | 11/2005 | Teraoka et al. | 475/154 |
| 7,247,118 B2* | 7/2007 | Haruki et al. | 475/231 |
| 7,264,568 B2* | 9/2007 | Ludwig et al. | 475/233 |
| 2002/0103053 A1* | 8/2002 | Thompson | 475/231 |
| 2006/0014601 A1* | 1/2006 | Kelley, Jr. | 475/231 |
| 2007/0105684 A1* | 5/2007 | Gassmann et al. | 475/249 |

* cited by examiner

*Primary Examiner*—Roger Pang
(74) *Attorney, Agent, or Firm*—Anna M. Shih; Bradley J. Diedrich

(57) ABSTRACT

A differential having means (35) operable to limit rotation of an output gear (23) relative to a gear case (11), and actuation means (55) for actuating the rotation limiting means, from an unactuated (FIG. 1) to an actuated condition (FIG. 4). The rotation limiting means includes a member (47), toward one axial end of the gear case and moveable between a first position, the unactuated condition of said rotation limiting means, and a second position, the actuated condition. A sensor assembly is adjacent the one axial end of the gear case and includes a sensor element (71) and a wall-like member between the rotation limiting means and the actuation means. The wall-like member includes a non-ferromagnetic portion (73) between the sensor and the moveable member. Movement between the first and second positions results in a corresponding change in the electromagnetic flux (F) coupling the sensor element and the moveable member.

6 Claims, 4 Drawing Sheets

LIMITED SLIP DIFFERENTIAL AND ENGAGEMENT SENSING MECHANISM THEREFOR

BACKGROUND OF THE DISCLOSURE

The present invention relates to traction modifying differentials, and more particularly, to such differentials of the type in which the differential action may be retarded, and possibly even prevented ("locked"), in response to some sort of an input, for example, a mechanical input or an electrical input signal.

Furthermore, the present invention relates to engagement sensing mechanisms and systems of the type which may be utilized to sense a change-of-state within a traction modifying differential, for example, a change between an unlocked condition and a locked condition.

Traction modifying differentials of the type to which the present invention relates typically include a gear case defining a gear chamber, and disposed therein, a differential gear set including at least one input pinion gear, and a pair of output side gears. The present invention will be described in connection with a differential of the bevel gear type, although those skilled in the art will understand that the invention is not so limited, and could be utilized in connection with differentials having other gearing types, such as helical or planetary. Typically, a clutch pack is disposed between at least one of the side gears and an adjacent surface of the gear case, such that the clutch pack or locking mechanism is operable to limit relative rotation between the gear case and the one side gear. In most differentials of the type described, engaging the clutch pack or locking mechanism (to retard differentiation) is achieved by one of several different approaches.

In one approach, a "locking differential" of the type illustrated and described in U.S. Pat. No. Re 28,004, assigned to the assignee of the present invention and incorporated herein by reference, the clutch pack is normally disengaged. When one of the wheels begins to spin out, relative to the other wheel, a speed sensitive mechanism senses the speed differential between the wheels, and by means of a cam and ramp mechanism, locks the clutch pack solid. In the incorporated patent, the speed sensitive mechanism comprises a fly-weight mechanism, the output of which comprises the mechanical "input", in response to which the differential gearing is locked.

U.S. Pat. No. 5,019,021, also assigned to the assignee of the present invention and incorporated herein by reference, illustrates another approach to retarding differentiation. This patent illustrates and describes a "limited slip differential" in which the loading on the clutch pack may be varied in response to an external electrical input signal, thus varying the amount of slip within the clutch pack. Therefore, the amount of bias torque transmitted from one side gear to the other is also varied in response to changes in the external electric input signal. As is well known to those skilled in the art, in a limited slip differential, there is typically a certain amount of "slip" or speed differential, between the two side gears whenever the vehicle encounters less than optimum traction conditions. In the above-incorporated patent, the "input" to the differential is the electrical input signal, but within the differential, there is another "input" which is the axial movement of one of the plates of a ball ramp actuator, the axial movement of which varies the loading on the clutch pack in a manner which is now generally well known to those skilled in the art.

Finally, in U.S. Pat. No. 6,551,209, also assigned to the assignee of the present invention and incorporated herein by reference, there is illustrated a different approach to a "locking differential". In the above-incorporated patent, there is illustrated and described a locking differential in which there is no friction-type clutch pack, but instead, a mechanical locking arrangement. In the differential of the cited '209 patent, there is a ball ramp actuator which is able, in response to an electrical input signal, to move a series of pins into mating openings in the differential side gear, thus locking the side gear relative to the differential gear case. For purposes of the present invention, the movement of the pins, toward or away from the side gear, to achieve either a locked condition or an unlocked condition, respectively, is also considered an "input" in regard to a means for limiting rotation of an output gear relative to a gear case in a differential.

Thus, it may be seen, from a review of the above-described types of limited slip and locking differentials, that there are a number of different mechanisms known to those skilled in the art which are commonly used to limit (retard), or lock, the relative rotation between a differential gear case and one of the output side gears. However, it should be noted that most of the known, prior art limited slip and locking differential arrangements, and especially those which have been commercialized by the assignee of the present invention, have in common the presence of some sort of member which moves axially, in connection with the operation of the mechanism which achieves the slip limiting or locking function within the differential.

More recently, an increasing percentage of vehicles (especially passenger cars and light trucks) are incorporating some sort of stability, or traction, or safety system into the drive train. Examples of such systems would include a traction control system (TCS), an anti-skid braking system (ABS), and an electronic stability program (ESP). It is quite common, and desirable, for such systems to include some sort of traction modifying device, and preferably, an electrically-actuated limited slip or locking differential. In order for these types of systems to operate most effectively and safely, it is important for the control logic of the system to receive some sort of feedback signal from the differential, whereby the control logic can know, at any given instant, whether the differential is in an actuated (locked) condition, or in an unactuated (unlocked) condition.

Unfortunately, sensing the occurrence of a locked condition (or an unlocked condition) in a locking differential, or sensing an increasing clutch engagement (or a decreasing clutch engagement) in a limited slip differential involves sensing something such as the axial movement of a member within a differential gear case which, typically, is rotating within a stationary outer housing. One seemingly obvious way of mounting a sensor on a rotating differential case is to fix the sensor to the exterior of the case, and transmit the generated electrical signal from the differential to the vehicle microprocessor by means of slip rings. Unfortunately, such an arrangement is typically not feasible. For most differential installations, nothing can be attached to the exterior of (the outer diameter of) the differential case (or extend radially outward therefrom), because, in the axle assembly plant, it must be possible to slide the ring gear over the case outer diameter, and bolt the ring gear to the case flange.

Another hindrance encountered by those skilled in the art, in attempting to develop arrangements for sensing the "change-of-state" in a limited slip or locking differential is the fact that the sensing system utilized needs to be able to survive and operate effectively in a fairly severe environment. For example, the sensing mechanism and the overall system need to be able to operate predictably over a broad temperature range (e.g., from about −40 degrees Celsius to about 190 degrees Celsius). Also the sensing mechanism must be able to operate while submersed in a petrochemical-based lubricant, without any adverse effect upon the accuracy of the sensing system "output" signal, indicating the current state of the differential.

BRIEF SUMMARY OF THE INVENTION

Accordingly, it is an object of the present invention to provide an improved differential gear mechanism, and an improved sensing mechanism and assembly for use therein, which will overcome the above-described problems of the prior art.

It is a further object of the present invention to provide such an improved differential gear mechanism and improved sensing system for use therein which achieves the above-stated object, but without any substantial redesign of the underlying differential mechanism, and with no substantial increase in the overall package size of the differential gear mechanism.

It is a more specific object of the present invention to provide such an improved differential gear mechanism, and sensing system therefor, in which the occurrence of a change in the state of the differential can be sensed utilizing the axial movement, within the differential, of a member which is already a required part of the differential mechanism, rather than requiring some sort of additional "target" member.

The above and other objects of the invention are accomplished by the provision of an improved differential gear mechanism including a gear case defining an axis of rotation, and a gear chamber, differential gearing being disposed in the gear chamber including at least one input gear and first and second output gears. The mechanism includes means operable to limit rotation of the first output gear relative to the gear case, and actuation means for actuating the rotation limiting means, the actuation means being operable in response to an input, to move the rotation limiting means from an unactuated condition to an actuated condition. The rotation limiting means includes a member, disposed toward one axial end of the gear case and moveable in the direction of the axis of rotation between a first position corresponding to the unactuated condition of the rotation limiting means, and a second position corresponding to the actuated condition.

The improved differential gear mechanism is characterized by a sensor assembly being disposed adjacent the one axial end of the gear case and including a sensor element and a wall-like member disposed axially between the rotation limiting means and the actuation means. The wall-like member includes a non-ferromagnetic portion disposed axially between the sensor element and the moveable member, whereby movement of the moveable member between the first and the second positions results in a corresponding change in the electromagnetic flux coupling the sensor element and the moveable member.

In accordance with another aspect of the present invention, there is provided a mechanism including a case defining an axis and a chamber, the mechanism including an actuation means for actuating the mechanism, the actuation means being operable in response to an input to move the mechanism from an unactuated condition to an actuated condition. The mechanism includes an axially moveable member disposed toward one axial end of the case and moveable in the direction of the axis between a first position corresponding to the unactuated condition of the mechanism, and a second position corresponding to the actuated condition.

The improved mechanism is characterized by a sensor assembly being disposed adjacent the one axial end of the case and including a sensor element and a wall-like member disposed axially between the mechanism and the actuation means. The wall-like member includes a non-ferromagnetic portion disposed axially between the sensor element and the axially moveable member, whereby movement of the axially moveable member between the first and the second positions results in a corresponding change in the electromagnetic flux coupling the sensor element and the axially moveable member. The sensor element comprises an electromagnetic coil disposed adjacent the one axial end of the case and disposed generally concentrically about the axis.

DETAILED DESCRIPTION OF THE PREFERRED EMBODIMENT

Figure 1:
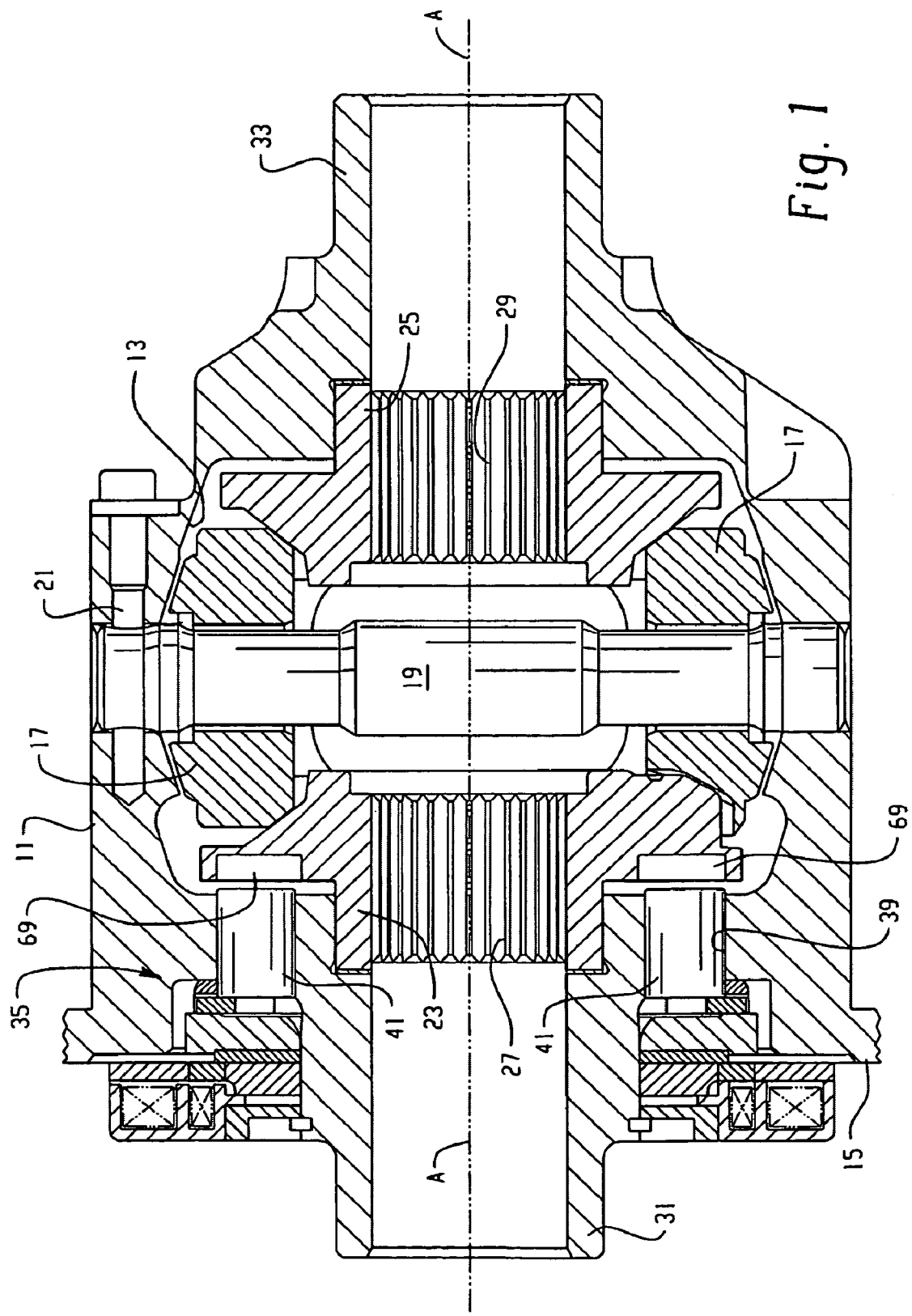
FIG. 1 is an axial cross-section of a locking differential made in accordance with the teachings of the present invention, in an unactuated, unlocked condition.

Referring now to the drawings, which are not intended to limit the invention, FIG. 1 is an axial cross-section of a slip-limiting differential, and more specifically, of a locking differential including the present invention. The specific construction and operation of differentials of the general type to which this invention relates, and of the specific type illustrated in FIG. 1, may be better understood by reference to the above-incorporated patents. Specifically, the overall construction and function of the locking differential shown in FIG. 1 is quite similar to that illustrated and described in above-incorporated U.S. Pat. No. 6,551,209.

However, as has already been noted, the usefulness of the present invention is not restricted to only locking differentials, but could be also advantageous when used on limited slip differentials, at least on those including some sort of a member within the differential which moves axially within the differential case such that the movement of the member is representative of a change between a slipping condition and a slip-limiting condition. Furthermore, the use of the present invention is not restricted to any particular configuration of differential, except as is specifically noted in the appended claims. Finally, it should be noted that, in one aspect, the present invention comprises a sensing assembly and system which may be used effectively to sense the change of state of an associated mechanism which includes a member disposed therein, wherein movement of the member corresponds to a change in the operating state or condition of the associated mechanism.

The differential gear mechanism (locking differential) shown in FIG. 1 includes a gear case 11 which defines therein a gear chamber, generally designated 13. In the subject embodiment, and by way of example only, the gear case 11 comprises a single, unitary gear case, and all parts within the differential are inserted through a "window" (not shown herein) in the gear case 11, as is well known to those skilled in the art. However, it should be understood that the present invention is not limited to any particular configuration of gear case 11, or any particular configuration of window, or even, to the presence of such a window. Torque input to the differential is typically by means of an input ring gear (not shown herein), which may be attached to a flange 15 (shown only fragmentarily herein) of the gear case 11 by any suitable means, such as a plurality of bolts (also not shown herein).

Disposed within the gear chamber 13 is a differential gear set including a pair of input pinion gears 17 which are rotatably mounted on a pinion shaft 19. Typically, the pinion shaft 19 is secured relative to the gear case by any suitable means, such as a locking pin 21. The pinion gears 17 comprise the input gears of the differential gear set, and are in meshing engagement with a pair of side gears 23 and 25. The side gears 23 and 25 define sets of internal, straight splines 27 and 29, respectively, which are adapted to be in splined engagement with mating external splines of a pair of axle shafts (not shown). The gear case 11 includes annular hub portions 31 and 33 on which may be mounted a pair of bearing sets (not shown herein) which are used to provide rotational support for the differential mechanism relative to an outer differential housing (also not shown herein).

As is well known to those skilled in the art, during normal straight-ahead operation of the vehicle, no differentiation occurs between the left and right side gears 23 and 25, and therefore, the pinion gears 17 do not rotate relative to the pinion shaft 19. The gear case 11, the pinion gears 17, and the side gears 23 and 25 all rotate about an axis of rotation A (shown only in FIGS. 1 and 2) as a solid unit.

It should be understood that the locking differential of the present invention may be operated in either of several modes. The differential may be operated manually, i.e., wherein the driver manually selects the locked mode, such that the differential operates in the locked mode almost immediately after the vehicle begins to move. Alternatively, the locking differential may operate in an "automatic mode" wherein, by way of example only, the vehicle microprocessor senses an operating condition, such as incipient wheel slip and transmits an appropriate electrical input signal ("input") to the locking differential, thus locking the side gear 25 relative to the gear case 11, to prevent any further differentiation.

In the case of the automatic mode of operation of the locking differential, it will be understood that under certain operating conditions, such as when the vehicle is turning or a slight difference in tire size exists, it is permissible for a certain amount of differentiating action to occur between the side gears 23 and 25. However, in accordance with the present invention, the locking differential may or may not include a clutch pack, or any other similar mechanism which merely retards or limits differentiating action, but instead may provide a choice between only an unactuated condition as shown in FIG. 1 and an actuated, locked condition, not separately shown herein.

Figure 2:
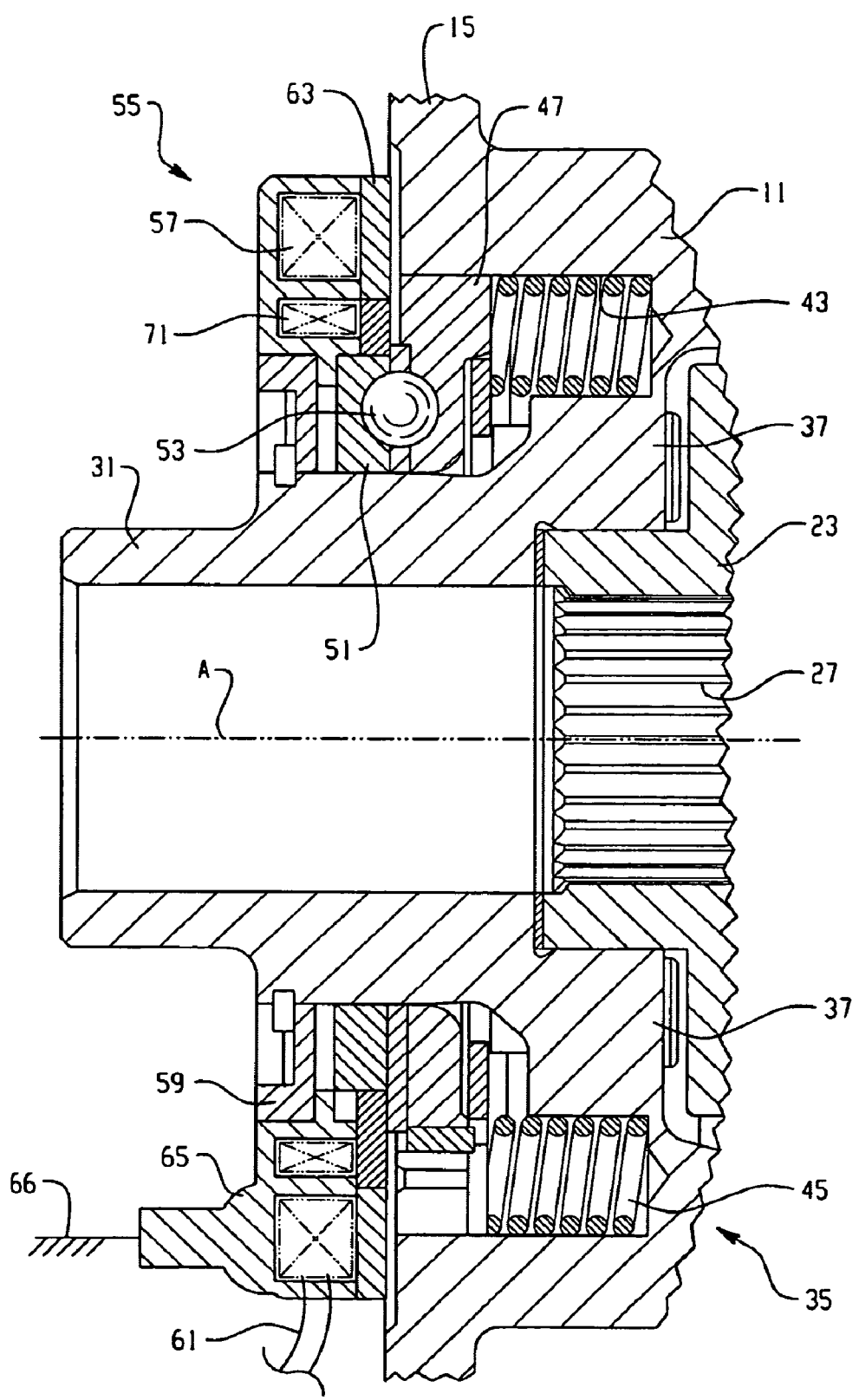
FIG. 2 is an enlarged, fragmentary, axial cross-section, similar to FIG. 1, but taken on a plane different than that of FIG. 1.

Referring now to FIG. 2, in conjunction with FIG. 1, the locking differential of the present invention includes a rotation limiting mechanism, generally designated 35. The rotation limiting mechanism 35 may be better understood by reference to the above-incorporated U.S. Pat. No. 6,551,209. It should be understood by those skilled in the differential art that, because the present invention is not limited to any particular structure or mode of operation of the rotation limiting mechanism 35, except as specifically otherwise noted in the appended claims, the mechanism 35 will be described only briefly herein, and only by way of background and example. The gear case 11 includes an end wall 37 which defines two arrays of bores. The first array of bores (shown in FIG. 1), comprises a plurality of pin bores 39 which extend axially through the entire axial extent of the end wall 37. Disposed within each of the pin bores 39 is an axially moveable, generally cylindrical pin member 41 (also referred to hereinafter, and in the appended claims, as a "lock member"). The second array of bores (see FIG. 2) comprises a plurality of spring bores 43, which extend from the left end in FIG. 2 of the end wall 37 only partially through the axial thickness of the end wall 37, such that within each spring bore 43 there is seated a coiled compression spring 45.

The left end of each of the compression springs 45 is seated against an inner ramp plate 47 (see also FIG. 3) of a ball ramp actuator, generally designated 49. The ball ramp actuator 49 also includes an outer ramp plate 51, and a plurality of cam members (balls) 53 are disposed between the inner ramp plate 47 and the outer ramp plate 51, in a manner now well known to those skilled in the art of ball ramp actuators. The ball ramp actuator 49 may be considered as part of the rotation limiting mechanism 35.

Disposed axially outward of the gear case 11 (to the left in FIGS. 1 and 2 from the ball ramp actuator 49) is an electromagnetic actuator, generally designated 55, which preferably comprises an annular electromagnetic coil 57 disposed radially outward from, and supported by, an annular support member 59. The support member 59 surrounds the larger diameter portion of the annular hub portion 31, such that the electromagnetic actuator 55 is stationary, (i.e., is fixed relative to an outer differential housing which is not shown herein), and the gear case 11 is free to rotate therein, and relative thereto. The electromagnetic actuator 55 is, in certain aspects, illustrated and described in greater detail in one or more of the above-incorporated patents.

Actuation of the electromagnetic coil 57 occurs in response to an electrical input signal, transmitted to the coil 57 by means of a pair of electrical leads 61 (see FIG. 2), the reference numeral "61" to be used hereinafter to designate either the leads themselves, or the electrical input signal.

Figure 3:
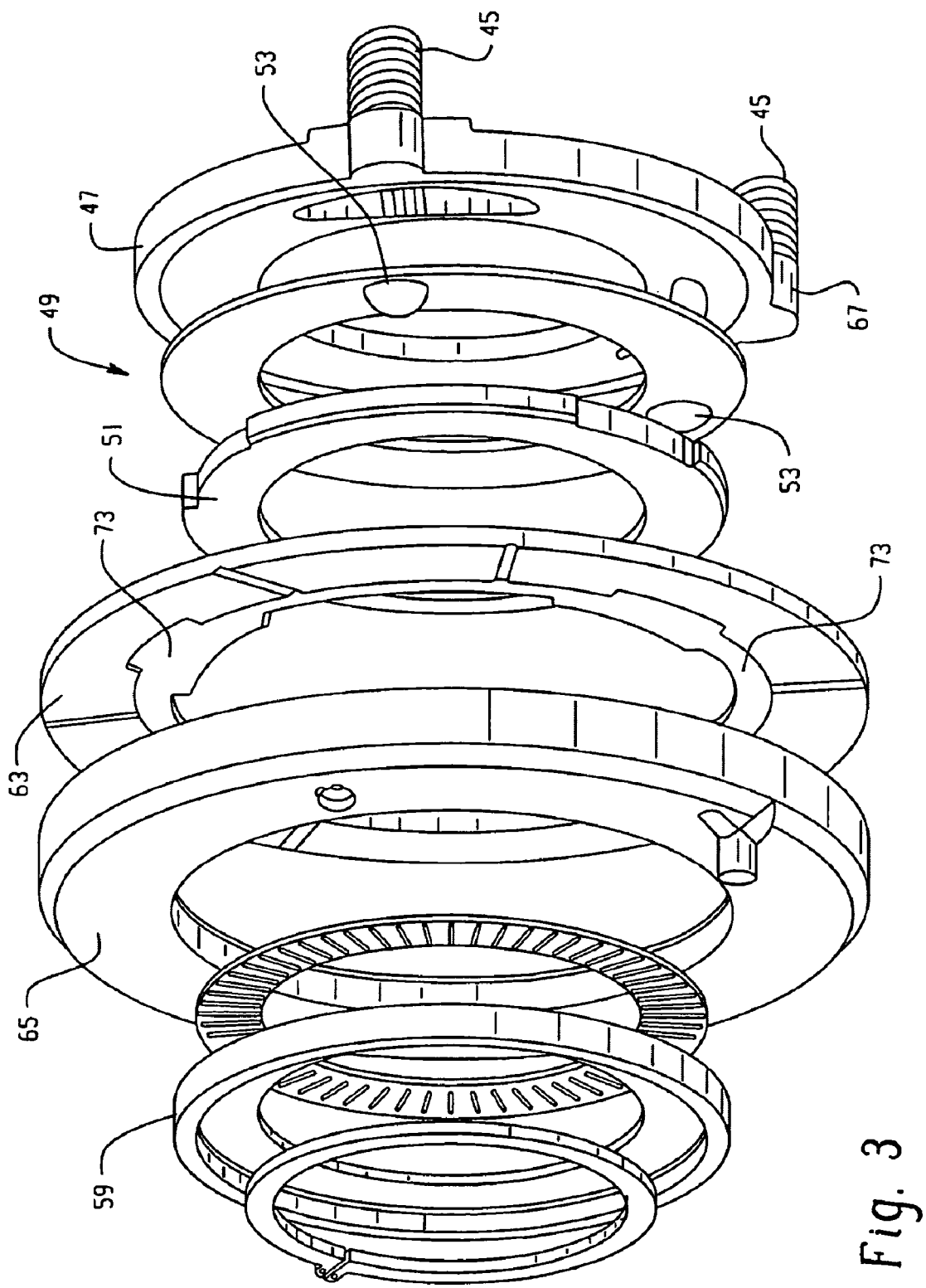
FIG. 3 is a fragmentary, exploded, perspective view of a portion of the differential gear mechanism shown in FIGS. 1 and 2.

Referring now primarily to FIGS. 2 and 3, disposed immediately adjacent the electromagnetic coil 57 is an annular drive plate 63 which is fixed, by any suitable means such as splines, to be non-rotatable relative to the outer ramp plate 51. The connection between the drive plate 63 and the outer ramp plate 51 will be described in greater detail subsequently, in connection with the description of the sensing mechanism of the present invention. Therefore, and as is now well known to those skilled in the art, and as is illustrated and described in the above-incorporated patents, when the coil 57 is energized, the resulting flux path passes through the drive plate 63 and draws the plate into frictional engagement with adjacent friction surfaces on a coil housing 65. The coil housing 65 is preferably fixed to be non-rotatable relative to an outer differential housing, not shown herein, but represented in FIG. 2 by a "ground" symbol, designated 66. The result is to retard rotation of the annular drive plate 63 and therefore of the outer ramp plate 51, relative to the gear case 11. However, the inner ramp plate 47 is fixed to rotate with the gear case 11, such as by means of a plurality of ears 67 (see FIG. 3), and therefore, the ramping action results in rightward axial movement (in FIGS. 1 through 3) of the inner ramp plate 47, in opposition of the biasing force of the compression springs 45. Referring again primarily to FIG. 1, the "outer" face of the side gear 23 (i.e., the side facing the end wall 37), defines a plurality of openings 69, the openings 69 being arranged in an array which matches, or mates with, the array of pin bores 39. Therefore, with the arrays of pin bores 39 and openings 69 circumferentially aligned (the position shown in FIG. 1), actuation of the electromagnetic coil 57 will move the inner ramp plate 47 to the right in FIG. 1, and move the pin members 41 into engagement within the openings 69, thus locking the side gear 23 relative to the gear case 11 (the actuated or "locked" condition).

Most of what has been described up to this point is already known, primarily from the above-incorporated patents. Referring now to all of the drawing figures in conjunction with each other, an important aspect of the present invention will be described. As stated previously, one of the objects of this invention is to be able to sense the occurrence of either the locked condition, or the unlocked condition (i.e., to be able to sense the change of state of a mechanism), utilizing the axial movement, within the mechanism, of a member which comprises part of the mechanism.

In the subject embodiment, and by way of example only, the "axially moveable member" includes the inner ramp plate 47 of the ball ramp actuator 49. In accordance with one aspect of the invention, the inner ramp plate 47 itself serves as the "axially moveable member", for purposes of the appended claims, without the need for any added structure to serve as a target to be sensed by the sensing mechanism, which is to be described hereinafter.

Figure 4:
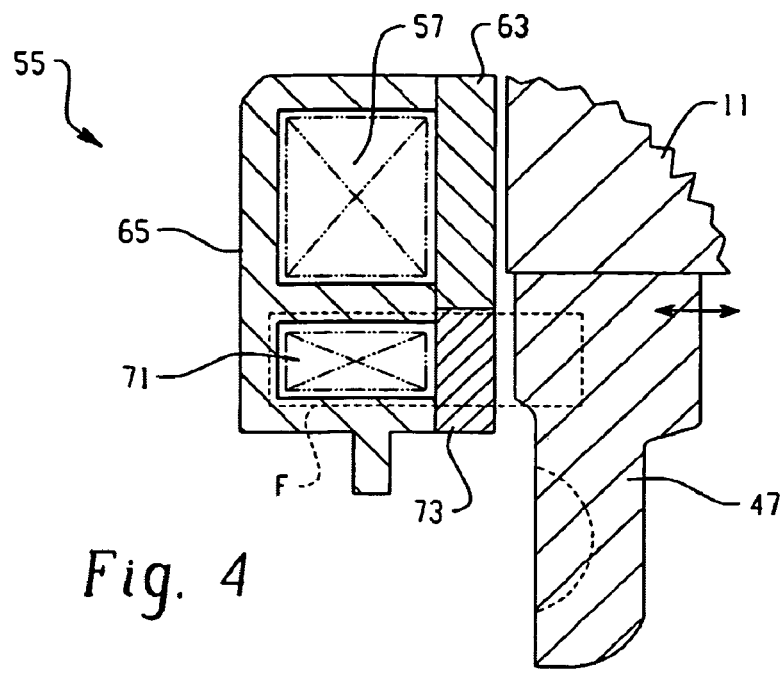
FIG. 4 is an enlarged, fragmentary, somewhat schematic axial cross-section, similar to FIG. 2, illustrating one important aspect of the present invention.

Referring now primarily to FIGS. 2, 3 and 4, the sensing mechanism of the present invention will be described. In accordance with a preferred embodiment of the invention, the coil housing 65 is of the "two cavity" type, (i.e., the coil housing 65 defines not only a cavity for the electromagnetic coil 57 (the "actuation" coil), but also provides a cavity within which is disposed a sensing coil 71), the function of which will be described subsequently. The sensing coil 71 may comprise simply an electromagnetic coil, or may comprise a magnetically-biased coil. In either case, the sensing coil 71 (also referred to hereinafter in the appended claims as a "sensor element") preferably provides a "proximity" sensing device, as that term is well understood in the sensing art. As is well known to those skilled in the art of electromagnetic actuation, the coil housing 65 comprises a ferromagnetic member, as does the annular drive plate 63 which comprises part of the electromagnetic "circuit" for purposes of actuation of the ball ramp actuator 49. The inner ramp plate 47 also preferably comprises a ferromagnetic member, for reasons which will become apparent subsequently.

However, in accordance with an important aspect of the invention, the radially "inner" portion of the drive plate 63, immediately adjacent the sensing coil 71, is replaced by an annular window member 73, best seen in FIGS. 3 and 4. The term "window" is used herein in regard to the member 73 primarily to explain that, for purposes of the present invention, the window member 73 is not ferromagnetic , and therefore, the electromagnetic circuit (or flux "path") is not "contained" within the window member 73, but instead, permits the flux lines F (see FIG. 4) to pass through. By way of contrast, and as is well known in the electromagnetic arts, the flux lines resulting from actuation of the coil 57 would be contained within the drive plate 63, with lines of flux passing vertically therethrough. In the subject embodiment, and by way of example only, the annular window member 73 comprises an aluminum member, such that the window member 73 has the structural integrity and durability to transmit torque from the annular drive plate 63 to the outer ramp plate 51. As is also well known to those skilled in the art, the aluminum window member 73 will slightly increase the flux density, as compare to air.

At the same time, and as may best be seen in FIG. 4, the annular window member 73 is disposed axially between the sensing coil 71 and the inner ramp plate 47, the axially movable member in the subject embodiment. When a sensing current is imposed upon the sensing coil 71, the result is the electromagnetic flux path F, as shown in FIG. 4. The flux path F passes through the coil housing 65, around the sensing coil 71, passes through the window member 73, across an adjacent air gap, then through part of the inner ramp plate 47. As is known from the previous, brief description of the operation of the rotation-limiting mechanism 35 and the electromagnetic actuator 55, the inner ramp plate 47 moves axially (see arrow in FIG. 4) between a first condition (FIG. 2), corresponding to the unactuated condition of the mechanism 35, and a second condition (position toward which inner ramp plate 47 is moving in FIG. 4), corresponding to the actuated condition of the mechanism 35.

In accordance with an important aspect of the invention, as the axial position of the inner ramp plate 47 changes, the magnetic flux path length changes, but is unaffected by the window member 73. The changes in the flux path length which result from the inner ramp plate 47 moving further from, or closer to, the sensing coil 71 result in either a decrease or an increase, respectively, in the flux density (or Inductance) of the flux path F. The changes in flux density (or inductance) may then be sensed, or monitored, by an external control circuitry which is capable of "converting" the sensed flux density (or inductance) into a value representative of the changes in the axial separation between the sensing coil 71 and the ramp plate 47.

Figure 5:
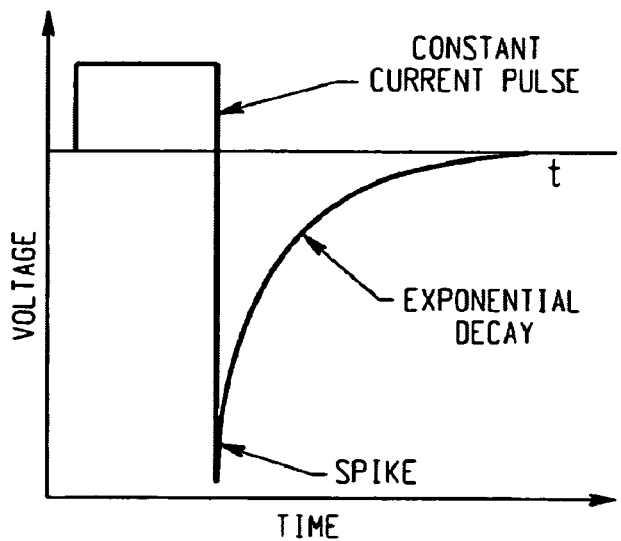
FIG. 5 is a graph of Voltage versus Time, illustrating an important relationship utilized, in one embodiment, by the sensing mechanism of the present invention.

Referring now primarily to FIG. 5, there is a graph of Voltage versus Time, illustrating an important relationship utilized by one embodiment of the sensing mechanism of the present invention. In connection with the development of the invention, several different proximity-type sensing arrangements were investigated, including one known as pulse induction (PI) sensing. In a PI sensing arrangement, the sensing coil 71 is charged to a known current ("Constant current pulse" in FIG. 5). This known current produces a magnetic field which induces the magnetic flux path F shown in FIG. 4. This flux path F stores energy in the materials (Energy=$\frac{1}{2}LI^2$). The known coil current is then abruptly terminated, causing the magnetic flux path F to cease (decay) and energy to be dissipated. As the magnetic flux path F changes, the change will cause eddy currents to flow in the inner ramp plate 47, but the eddy currents will decay slowly because of the internal resistance of the ferromagnetic ramp plate 47.

As the above-described eddy currents flow in the ramp plate 47, the eddy currents also produce a magnetic field, which, in turn, induces a current back into the sensing coil 71, resulting in a back-EMF (electromotive force). When the resulting voltage (from the back-EMF) is measured across the sensing coil 71, there is a negative voltage spike ("SPIKE" in FIG. 5), having an exponential decay rate or curve, as shown in FIG. 5. The decay rate of the negative spike is a function of the inductance, which, in turn, is directly related to the air gap distance from the sensing coil 71 to the inner ramp plate 47. However, it should be understood by those skilled in the sensing art that the present invention is not limited to the above-described, or any other particular, sensing concept, except as specifically noted otherwise in the appended claims.

A variety of sensing systems are available and well known and the present invention is not limited to pulse induction sensing. Tuned "tank" oscillator circuits, whereby an inductor and capacitor form a tuned frequency oscillator, can be used as well to determine the distance by measuring the frequency of oscillation. As this concept can be used to look for any metal, it will not "see" thru the aluminum if the frequency is too high. It does include the tuned oscillator front end circuitry. Other known magnetic proximity sensors and LVDT arrangements could be implemented as well. It was found, in connection with the development of the present invention, that the pulse induction sensing was relatively simple and was effective when implemented in this particular environment.

In view of the particular application for the present invention, the above-described sensing concept comprises a preferred embodiment, partly because it was found to be effective under a broad range of operating temperatures (from about −40 degrees Celsius to about 190 degrees Celsius), and while immersed in various petrochemical-based lubricants (such as gear oils). Neither the temperature variations nor the various oils appeared to have a negative effect upon the ability to accurately sense the change-of-state (axial movement) of the ramp plate 47.

Figure 6:
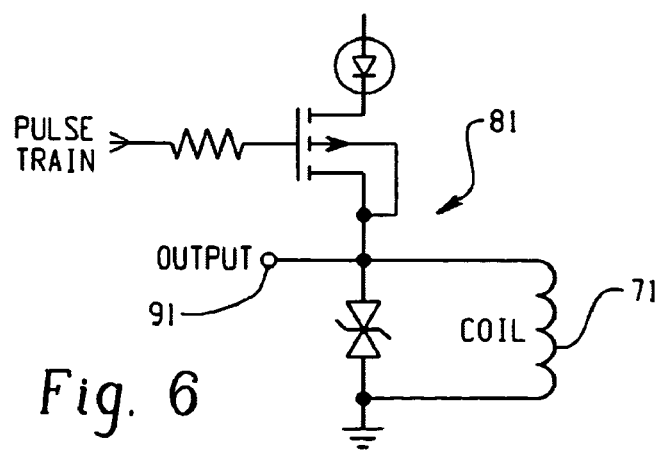
FIG. 6 is an electrical circuit schematic representing a portion of an embodiment of control circuitry which may be used with the engagement sensing mechanism of the present invention.

Referring now primarily to FIG. 6, there is illustrated a portion of an electrical control circuitry, generally designated 81, which may be used to implement the sensing concept illustrated and described in connection with FIG. 5. In the circuit shown in FIG. 6, a Pulse Train (shown as the Constant Current Pulse in FIG. 5) is an input to the control circuitry 81. The "Output" of the control circuit 81 is an analog signal 91 which is representative of the distance of the inner ramp plate 47 from the sensing coil 71.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A differential gear mechanism including a gear case defining an axis of rotation, and a gear chamber; differential gearing disposed in said gear chamber including at least one input gear and first and second output gears; means operable to limit rotation of said first output gear relative to said gear case, and actuation means for actuating said rotation limiting means, said actuation means being operable in response to an input, to move said rotation limiting means from an unactuated condition to an actuated condition, said rotation limiting means including a member, disposed toward one axial end of said gear case and moveable in the direction of said axis of rotation between a first position corresponding to said unactuated condition of said rotation limiting means, and a second position corresponding to said actuated condition, characterized by:

(a) a sensor assembly being disposed adjacent said one axial end of said gear case and including a sensor element and a wall-like member disposed axially between said rotation limiting means and said actuation means;

(b) said wall-like member including a non-ferromagnetic portion disposed axially between said sensor element and said moveable member, whereby movement of said moveable member between said first and said second positions results in a corresponding change in the electromagnetic flux coupling said sensor element and said moveable member.

2. A differential gear mechanism as claimed in claim 1, characterized by said means operable to limit rotation of said first output gear relative to said gear case includes a plurality of lock members disposed within openings defined by said one axial end of said gear case, and axially moveable from an unlocked position to a locked position, in engagement with mating openings defined by said first output gear.

3. A differential gear mechanism as claimed in claim 1, characterized by said actuation means comprises a first electromagnetic coil disposed adjacent said one axial end of said gear case and disposed generally concentrically about said axis of rotation.

4. A differential gear mechanism as claimed in claim 3, characterized by said wall-like member including a ferromagnetic portion disposed axially between said first electromagnetic coil and said rotation limiting means, said sensor element being disposed radially inward from said first electromagnetic coil.

5. A differential gear mechanism as claimed in claim 4, characterized by said sensor element comprises a second electromagnetic coil being disposed generally concentrically about said axis of rotation.

6. A differential gear mechanism as claimed in claim 5, characterized by said first and second electromagnetic coils being disposed within a common, ferromagnetic coil housing, said coil housing being fixed relative to an outer differential housing.

\* \* \* \* \*